United States Patent [19]

Clark, Jr.

[11] Patent Number: 4,769,988

[45] Date of Patent: Sep. 13, 1988

[54] COMPRESSED AIR GENERATING SYSTEM

[76] Inventor: Joseph H. Clark, Jr., P.O. Box 452, Perryton, Tex. 79070

[21] Appl. No.: 145,677

[22] Filed: Jan. 14, 1988

Related U.S. Application Data

[63] Continuation of Ser. No. 910,781, Sep. 23, 1986, abandoned, which is a continuation of Ser. No. 615,728, May 31, 1984, abandoned.

[51] Int. Cl.[4] .......... F16D 31/02

[52] U.S. Cl. .......... 60/370; 60/371; 60/412; 60/416; 91/24

[58] Field of Search .......... 60/370, 371, 407, 412, 60/416, 186, 39.63, 39.62; 92/20, 24, 32, 28, 27, 6; 180/165, 302

[56] References Cited

U.S. PATENT DOCUMENTS

| | | | |
|---|---|---|---|
| 2,486,982 | 11/1949 | Rossman | 60/486 |
| 2,994,310 | 8/1961 | Hopwood | 91/28 |
| 3,885,387 | 5/1975 | Simington | 60/370 |
| 3,925,984 | 12/1975 | Holleyman | 60/371 |
| 4,018,050 | 4/1977 | Murphy | 60/370 |
| 4,102,130 | 7/1978 | Stricklin . | |
| 4,124,978 | 11/1978 | Wagner . | |
| 4,210,062 | 7/1980 | Plesko . | |
| 4,292,804 | 10/1981 | Rogers, Sr. | 91/275 X |
| 4,380,904 | 4/1983 | Zappia . | |
| 4,481,768 | 11/1984 | Goshorn et al. | 60/407 |

FOREIGN PATENT DOCUMENTS

| | | | |
|---|---|---|---|
| 28314 | 2/1925 | France | 60/39.62 |
| 1190131 | 10/1959 | France | 91/20 |

*Primary Examiner*—Edward K. Look
*Attorney, Agent, or Firm*—Arnold, White & Durkee

[57] ABSTRACT

A compressed air power plant which includes a piston disposed within a cylinder and connected to a drive shaft. The piston is operated through a power stroke and an exhaust stroke upon each rotation of the drive shaft. The power plant includes compressed air means for supplying compressed air at a high pressure and at a second pressure lower than the high pressure. A distributing means is operatively associated with the compressed air means for selectively communicating the high pressure compressed air to the cylinder at the initial portion of the power stroke of the piston. An intake means is operatively associated with the cylinder and the compressed air means for selectively admitting compressed air at the second lower pressure to the cylinder at a predetermined time in the power stroke after the communication of high pressure air to the cylinder.

14 Claims, 3 Drawing Sheets

COMPRESSED AIR GENERATING SYSTEM

This application is a continuation of application Ser. No. 910,781, filed Sept. 23, 1986, which was a continuation of the parent application Ser. No. 615,728, filed May 31, 1984 both now abandoned.

BACKGROUND OF THE INVENTION

The present invention relates to compressed air power plants and more specifically, to construction of a highly efficient engine powered by compressed air. It further relates to a means of converting a standard internal combustion engine into an efficient compressed air power generating system.

There exists several designs for pneumatic or compressed air motors. For example, U.S. Pat. No. 3,925,984 to Holleyman discloses a compressed air power plant for a vehicle which includes a low pressure air tank maintained by a low pressure compressor driven by an electric motor and battery and a high pressure tank maintained by a high pressure pump driven by a motor. Air from the high pressure tank is fed to a converted internal combustion engine through a solenoid operated valving system. The low pressure exhaust air expelled from the cylinders is exhausted into an exhaust tank, where air from the exhaust tank and air from the low pressure tank are directed by pumps into the high pressure tank. Holleyman therefore apparently discloses a compressed air power plant in which high compressed air is directed to the power plant at a single pressure level from a single output source.

U.S. Pat. No. 3,885,387 to Simington relates to an apparatus for modifying an internal combustion engine to operate as a compressed non-combustible gas engine. The reference discloses a compressed air tank and a valve for distributing air to the various cylinders through the spark plug ports. Simington also teaches the use of a single input of air at a single pressure to the cylinders of an engine providing power.

Other patents disclosing compressed air engines include U.S. Pat. Nos. 4,124,978 to Waggoner; 4,210,062 to Plesko; 4,018,050 to Murphy; 4,102,130 to Stricklin; 4,380,904 to Zappia.

While the above references appear to disclose air operated devices, it is believed that the efficiency provided by such devices may be exceeded by a compressed air power plant having a two stage system for supplying compressed air to the cylinders as described in greater detail below.

SUMMARY OF THE INVENTION

Accordingly, the present invention provides a compressed air power plant which includes a piston disposed within a cylinder and connected to a drive shaft. The piston is operated through a power stroke and an exhaust stroke upon each rotation of the drive shaft. The power plant includes compressed air means for supplying compressed air at a high pressure and at a second pressure lower than the high pressure. A distributing means is operatively associated with the compressed air means for selectively communicating the high pressure compressed air to the cylinder at the initial portion of the power stroke of the piston. An intake means is operatively associated with the cylinder and the compressed air means for selectively admitting compressed air at the second lower pressure to the cylinder at a predetermined time in the power stroke after the communication of high pressure air to the cylinder.

The compressed air power plant of the present invention therefore provides a system wherein the piston is initially driven by a burst of high pressure air, after which the movement of the piston is further assisted by the supply of compressed air at a second lower pressure. This two stage supply of compressed air helps to minimize the drag of the piston within the cylinder and maximize the power produced as the piston moves through the power stroke.

In a preferred embodiment of the present invention, the power plant further includes an exhaust means for selectively exhausting air from the cylinder during the exhaust stroke of the piston disposed therein. The exhaust means is adapted to communicate the air exhausted from the cylinder during the exhaust stroke directly to the compressed air means to assist in the supply of high pressure air.

The distributing means of the present invention may include a housing having an aperture, and a rotor rotatably mounted within the housing. The rotor has a central bore having an inlet and an outlet. The outlet is disposed such that upon rotation of the rotor, the outlet cyclically aligns with the housing aperture. The inlet of the bore of the rotor communicates with the compressed air means for receiving high pressure compressed air. A distributing line is connected between the distributor housing aperture and the cylinder for communicating high pressure air to the cylinders. The rotation of the rotor is closely coordinated with operation of the piston within the cylinder such that the rotor outlet aligns with the housing aperture when the piston is positioned at the initial portion of its power stroke whereby high pressure air from the compressed air means is selectively supplied to the cylinder at that time.

In one preferred embodiment of the present invention, the power plant further comprises cam means operatively associated with said intake means, said exhaust means, and said piston for cyclically opening and closing said intake means and said exhaust means in a selectively timed relationship to the power and exhaust stroke of the piston such that the intake means opens during a selected portion of the power stroke of the piston and such that the exhaust means opens during a selected portion of the exhaust stroke of the piston.

The present invention also provides a conversion kit for converting a standard internal combustion engine to a compressed air power plant wherein the engine has a plurality of cylinders with pistons disposed therein, each cylinder having an intake valve and an exhaust valve operatively associated therewith. The kit includes a cam shaft adapted to be mounted in the engine and operatively associated with the pistons, intake valves and exhaust valves. The cam shaft includes a plurality of cams shaped and sized to selectively open the intake valves and the exhaust valves in a timed relationship with the movement of the pistons such that each piston has a power stroke and an exhaust stroke with each revolution of the cam shaft and such that the intake valve for a cylinder is open during a selected portion of the power stroke of the piston for that cylinder and the exhaust valve for a cylinder is open during a selected portion of the exhaust stroke of the piston for that cylinder.

The kit further includes air distributing means for distributing compressed air to each of the cylinders at the initial portion of the power stroke of the piston disposed in each cylinder. The distributing means is securable to the engine such that it is driven by the engine in a selectively timed relationship with the movement of the pistons of the respective cylinders.

The kit also includes compressed air means for supplying air at a high pressure to the distributing means and at a second pressure lower than the high pressure to the intake valves of each of the cylinders.

In a preferred embodiment, the kit may further include a means for communicating air exhausted through the exhaust valves to the compressed air means to assist the supply of compressed air at a high pressure.

Accordingly, it is believed that the present invention improves upon the efficiency of other compressed air power plants through use of the two stage system of supplying air to the cylinders.

BRIEF DESCRIPTION OF THE DRAWINGS

This invention will be further illustrated by reference to the appended drawings which illustrate a particular embodiment of the compressed air power plant in accordance with the present invention.

DESCRIPTION OF A PREFERRED EMBODIMENT

Figure 1:
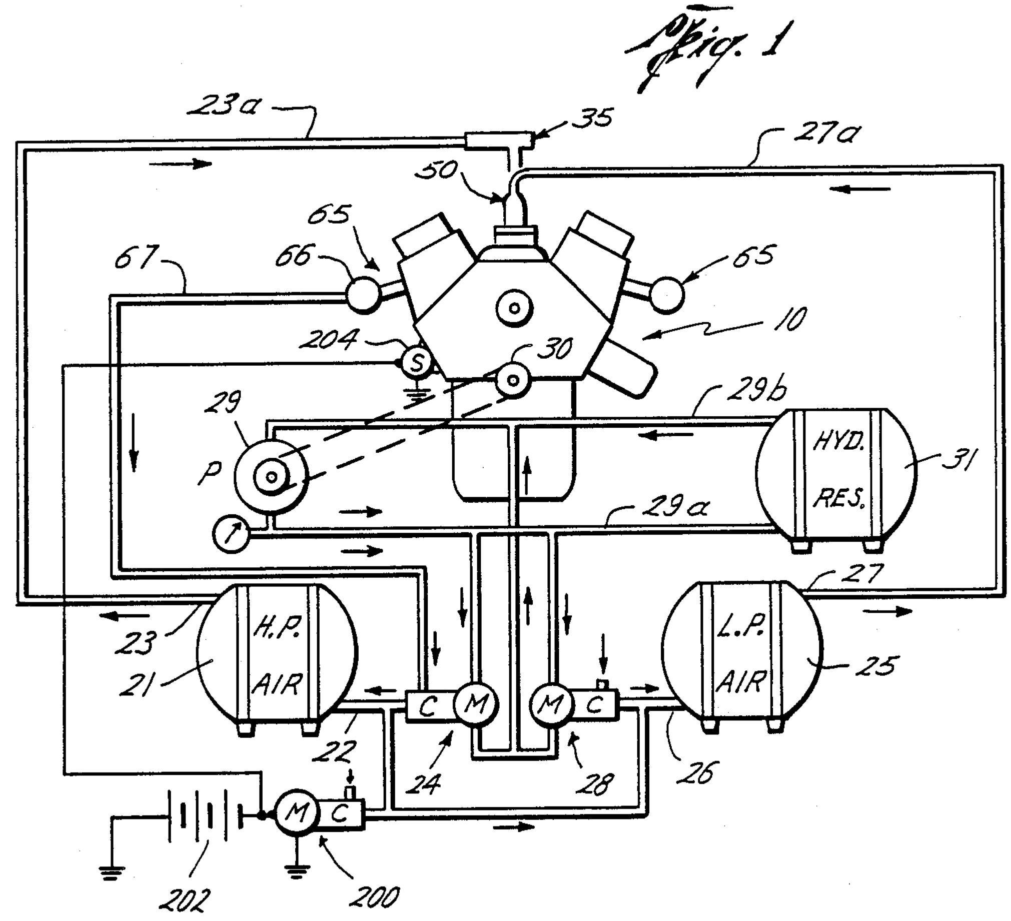
FIG. 1 is a schematic view of the compressed air power plant of the present invention.
Figure 2:
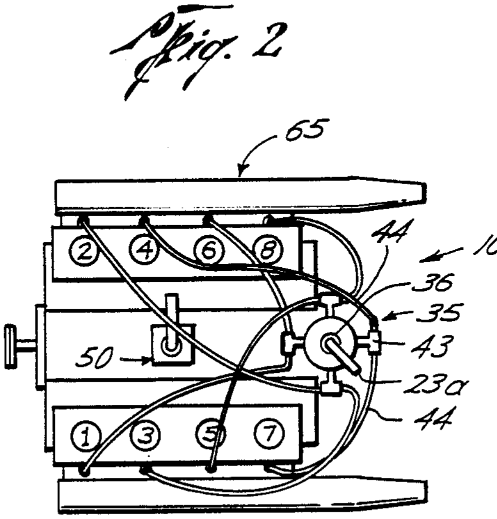
FIG. 2 is a top view of a V-8 engine converted to operate as a compressed air power plant in accordance with the present invention.
Figure 5:
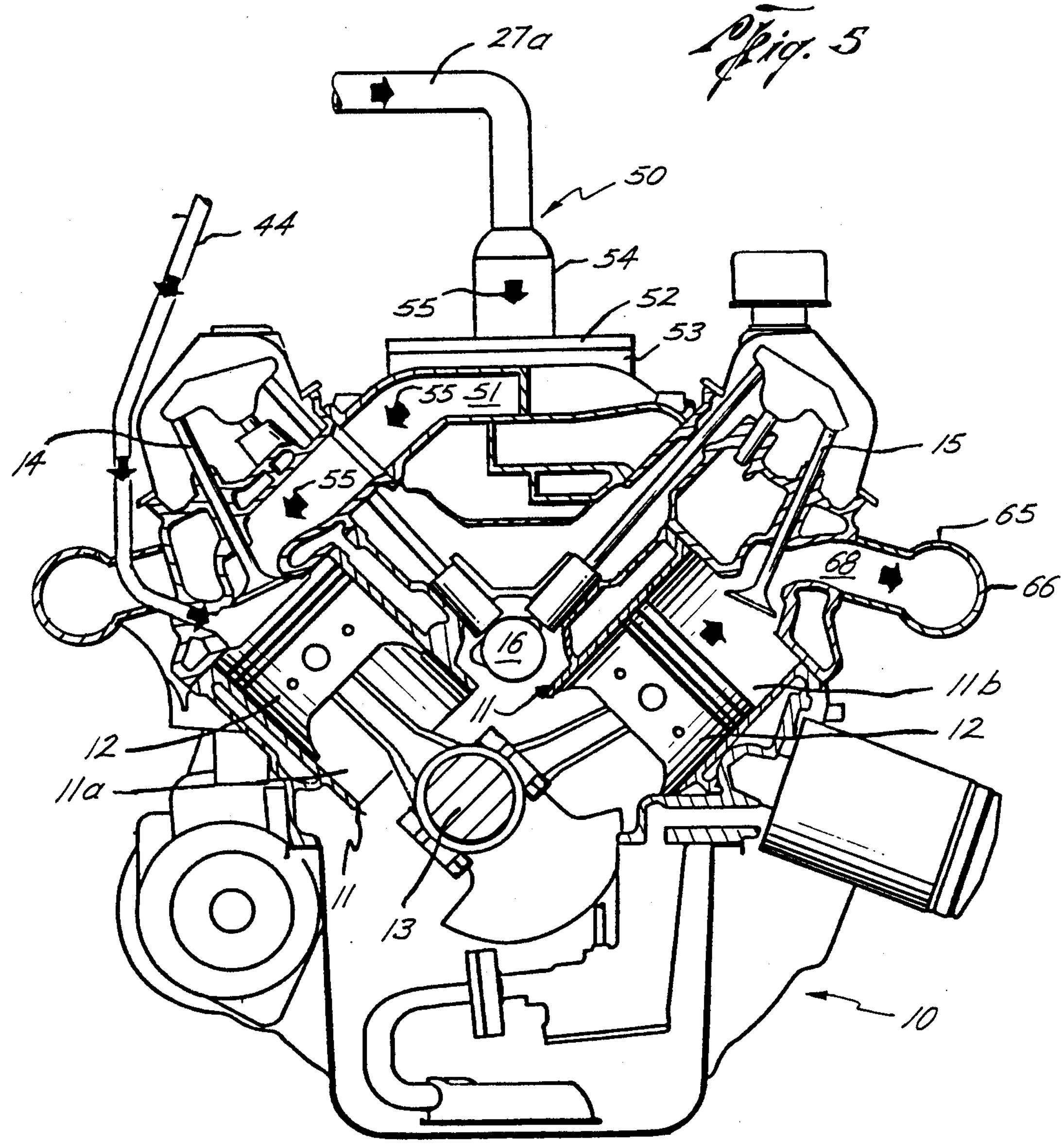
FIG. 5 is a partial cut away of a piston and cylinder engine illustrating the flow of compressed air to and through the engine.

Referring first to FIGS. 1, 2, and 5, a preferred embodiment of the present invention is generally represented by a piston and cylinder type engine 10 having a plurality of cylinders 11 with pistons 12 disposed therein. While the present invention is described herein as having multiple cylinders and pistons, it should be understood that the present invention is not limited to a specific number of such piston and cylinder combinations, such number being dependent upon the specific needs and requirements of the particular application to which the compressed air power generating system is used. It should also be understood that while the present invention described herein is directed in substantial portion to the conversion of a standard internal combustion engine into a highly efficient air operated engine, the present invention may also take the form of an engine constructive initially for the purposes of operating as described herein. A compressed air means 20 is operatively associated with the engine 10 for supplying compressed air to the cylinder 11 at two different pressure levels—a high pressure and a second pressure lower than the first high pressure. A distributing means 35 (FIG. 2) is also operatively associated with the engine 10 and compressed air means 20 for selectively communicating the high pressure compressed air to cylinder 11. An intake means 50 is operatively associated with the engine 10 and the compressed air means 20 for selectively admitting the second lower pressure compressed air to cylinder 11. An exhaust means 65 is operatively associated with engine 10 for selectively exhausting air from the respective cylinders and cycling the exhausted air back to the compressed air means 20 as described in greater detail below.

Referring now to FIG. 5, engine 10 is shown in cross section and may be comprised of any of a number of suitable piston and cylinder combinations. The engine 10 may include a plurality of cylinders 11 having piston 12 disposed therein. The pistons 12 are operatively connected to drive shaft 13 such that each piston passes through a downward power stroke and an upward exhaust stroke within the cylinder 11 as in prior known two-cycle engines.

In one preferred embodiment, the engine may be a standard internal combustion engine, such as for example and without limitation a standard 350 cubic inch Chevrolet 195 engine modified to operate using compressed air. The engine may be modified by using a cam shaft, timing chains and gears which have been particularly adapted to convert the four cycle, standard internal combustion engine having 8 cylinders to a two cycle engine where each of the eight piston and cylinder combinations are paired with one another such that each of the paired cylinders operates in unison with one another. More particularly, the engine maybe modified such that two pistons cycle in unison with each other and their power strokes being substantially simultaneous and powered or fired substantially simultaneously by injection of high pressure air described below. It can be appreciated however, that other piston and cylinder engines could be utilized in accordance with the present invention.

Figure 3:
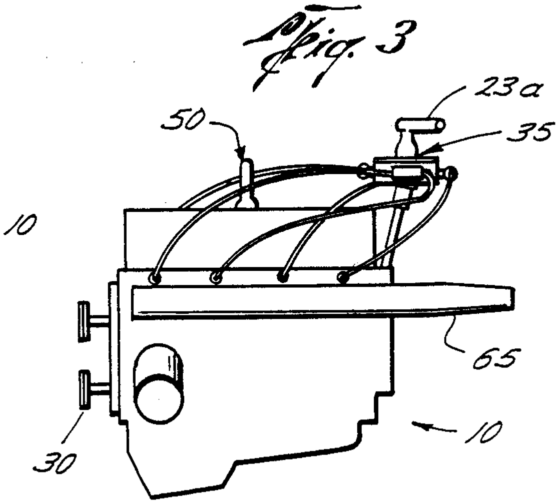
FIG. 3 is a side view of the engine shown in FIG. 2.

Referring back to FIG. 1, the compressed air means 20 may be any of a number of suitable devices or systems for supplying compressed air to the engine 10 at a high pressure and at a second pressure less than the high pressure. In the embodiment of FIG. 1, the compressed air means 20 includes high pressure compressed air tank 21 having inlet 22 and outlet 23. The inlet 22 of compressed air tank 21 is connected by a conduit to a high pressure air compressor 24. The outlet 23 of tank 21 is connected by conduit **23*a* to distributing means 35 (See FIGS. 2 and 3**).

Compressed air means 20 may further include a low pressure compressed air tank 25 having an inlet 26 and an outlet 27. Inlet 26 is connected by a conduit to low pressure air compressor 28 and outlet 27 is connected by conduit **27*a* to the intake means 50 mounted to the upper portion of engine 10 as shown in FIG. 1**.

Air compressors 24, 28 may be driven by an appropriate power source such as pressurized hydraulic fluid supplied by hydraulic pump 29 which is in turn driven by a power output device of the engine 10 such as the drive shaft pulley 30. Hydraulic fluid for operating pump 29 and compressor 24, 28 may be supplied to compressors 24, 28 through pump 29 from tank 31 through dual hydraulic lines **29*a* and 29*b* as best seen in FIG. 1**.

The high pressure compressed air tank 21 is supplied by air compressor 24 with air compressed sufficiently to obtain the power and response desired for the particular application of the present invention when such air is introduced into engine 10. In one preferred embodiment, the high pressure compressed air tank 21 is maintained at approximately 600 psi. It has been found, however, that the engine will operate over a wide range of pressures. As for example, it has been determined that the engine may operate at a low speed or idle with as little as 20 psi of air pressure being supplied to the engine.

The low pressure tank 25, in one embodiment, is maintained at a pressure less than the pressure of the high pressure tank 21. It should be understood that the term "low pressure" means an air pressure, for example in the tank 25, which is less than the operating high pressure, such as the pressure maintained in tank 21. In one preferred embodiment, it has been determined that the low pressure of tank 25 may be approximately 150 psi where the high pressure is maintained at approximately 600 psi.

It should be understood that the high and low pressures utilized in accordance with the present invention may be varied depending upon the operating conditions and characteristics of the various engines to be manufactured or converted as well as the performance requirements desired by the user of the device. Also, while the present disclosure is directed to the use of air as the operating fluid, it will be understood by one skilled in the art that other operating fluids may be substituted for air.

Intake means 50 is adapted to selectively direct low pressure air to the respective cylinders. Referring now back to FIG. 5, there is shown cylinder **11*a* of a conventional internal combustion engine 10 with intake valve 14 (shown in the closed position) positioned within connecting intake passageway 51. Also shown in FIG. 5 is cylinder 11*b* having an exhaust valve 15 (shown in the open position) with a connecting exhaust passageway 68 leading to exhaust manifold 66 which will be described in more detail below. In one preferred embodiment, intake means 50 includes the fuel intake passageways 51 and intake valve 14. The intake means 50 may further include flange 52 adapted to be secured to carburetor mounting plate 53 of a standard internal combustion engine such that a fluid tight seal is effected between the flange 52 and the mounting plate 53. Flange 52 is then connected in a fluid type manner to conduit line 27*a* by a reducing nipple 54 or other suitable means such that compressed air may be communicated through line 27*a*, through nipple 54, flange 52, plate 53 and into the intake passageways 51 thereby communicated directly to intake valves 14 as shown by arrows 55 of FIG. 5. Intake valves 14 may be operatively associated through pivoted arms and cam followers in a manner commonly known in the automobile industry with cam shaft 16 whereby valves 14 and 15 are selectively opened and closed during the power and exhaust strokes of a respective piston 12 by the rotational movement of cam 16**.

Figure 7:
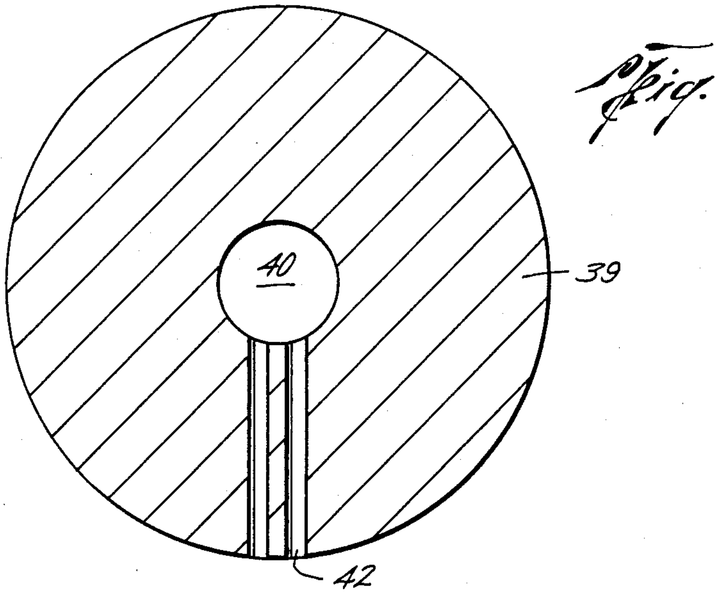
FIG. 7 is a sectional view of the rotor shown in FIG. 6 taken along lines VII—VII shown in FIG. 6.
Figure 6:
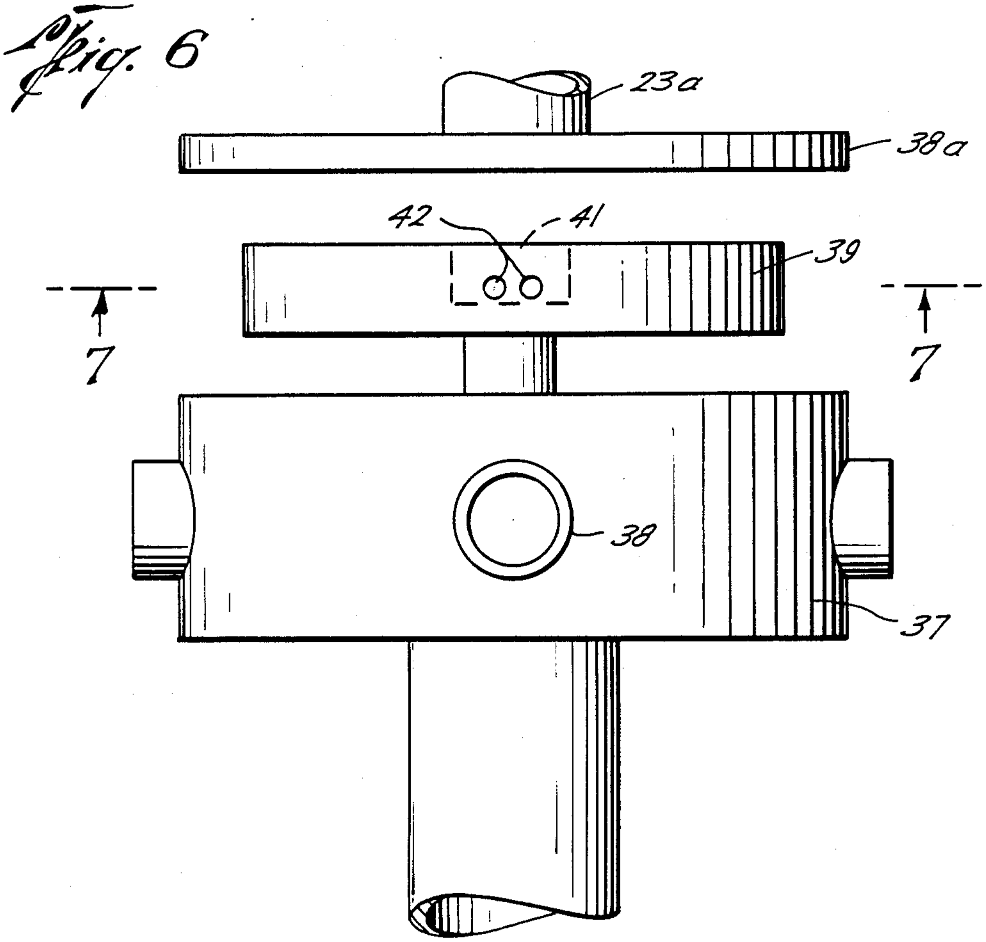
FIG. 6 is a partially exploded view of the distributor and rotor of the present invention.

The distributing means 35 (FIG. 2) may comprise any one of various devices which are adapted to distribute high pressure compressed air from tank 21 to the various cylinders 11 in a selectively timed manner which is coordinated with the operation of the valves 14, 15 and cam 16. Referring back to FIGS. 2, 6, and 7, distributing means 35 is shown as including an air distributor 36. Distributor 36 may include a housing 37 having a plurality of apertures 38 selectively spaced about its outer periphery. A rotor 39 is rotatably mounted within the housing 38 and housing top **38*a* and includes a central bore 40 having an outlet 41 open to the upper surface of rotor 39 as shown in FIG. 6 and outlet 42 opening to the side or circumferential surface of rotor 39 as shown in FIGS. 6 and 7. The outlet 42 is disposed such that upon rotation of the rotor 39 within stationary housing 37, outlets 42 sequentially aline with the internal openings of housing aperture 38. The inlet 41 of bore 40 is connected in fluid communication with connecting line 23*a* through top 38*a* to high pressure tank 21 whereby air from the high pressure tank 21 is communicated to bore 41 and is thereby selectively distributed through the various apertures 38 sequentially upon rotation of rotor 39 within housing 37**.

Distributor 36 is adapted to be mounted to the engine 10 (FIG. 3) and the rotor 39 rotated by operation of engine 10 in a manner similar to the means for mounting and rotating the electrical distributor of a conventional internal combustion engine. Such mounting and rotating is well known in the automobile industry art and it is believed additional detailed discussion setting forth the particular manner of providing coordinated and controled rotational movement to rotor 39 is unnecessary. It will be appreciated, however, that other means of mounting and rotating rotor 39 within distributor 36 such that its rotation is coordinated with the operation of the valves 14, 15 and piston 12 may be utilized by one skilled in the art without departing from the teachings of the present invention.

Referring back to FIG. 2, the distributor 36 may include multiple apertures which have been adapted for receiving a threaded T-member 43 (FIG. 2). Communicating line 44 may be connected to each side of the T-member 43 with each connecting line 44 extending to a different cylinder all as shown in FIG. 2. Arranged in such a manner, the distributor means 35 is capable of selectively distributing high pressure compressed air from tank 21 to paired cylinders of engine 10 such that the paired cylinders are supplied substantially simultaneously with high pressure air and are therefore powered or "fired" in pairs upon the introduction of the high pressure compressed air therein. Accordingly, a standard eight cylinder internal combustion engine which has been converted to utilize the present invention would be constructed such that four pairs of cylinders are utilized with each pair of cylinders being connected to a common T-member 43 through lines 44. As a result of this pairing, the eight cylinder engine would cycle in a manner such that it would effectively be operating as a four cylinder engine.

Referring now back to FIG. 5, the power plant of the present invention may further include an exhaust means 65 for exhausting air from cylinder 11 during the exhaust stroke of the piston 12. In one preferred embodiment, the exhaust means 65 includes an exhaust valve 15 (shown in the open position in FIG. 5) mounted to each cylinder 11 and operatively associated with cam shaft 16 as previously described with respect to valve 14 such that the exhaust valve 15 is opened and closed during a selected portion of the exhaust stroke for the piston 12 of cylinder 11. The exhaust means 65 further includes an exhaust manifold 66 connected in communication with connecting line 67 (FIG. 1). The connecting line 67 communicates between exhaust manifold 66 and the high pressure air compressor 24 as shown in FIG. 1. The exhausted air is thereby utilized to assist the compressed air means 20 in supplying high pressure compressed air to the system.

Accordingly, when the compressed air power plant of the present invention is utilized, the air tanks 24, 28 may be initially charged by auxiliary compressor 200 powered by an appropriate energy source such as battery 202. The engine 10 is initially started through the use of a standard electric starter 204 which also may be powered by battery 202. Once the cycle has been initiated, high pressure air from tank 21 is selectively injected into a cylinder of the motor 10 while the piston for that cylinder is positioned at the initial stage of the power stroke portion of the cycle. In one preferred embodiment, high pressure air is injected into the cylinder when the piston has moved downwardly into the power stroke such that the connected drive shaft 13 has rotated approximately 1° past the point at which the power stroke started, or approximately 1° after top dead center (ATDC). As can be understood, selection of the exact position of the piston at which time the high pressure air is injected may depend upon many factors such as construction of the particular engine and the power requirements of the ultimate engine and therefore the present invention should not be construed to be limited to a particular piston location at which injection of the high pressure air occurs. The intake means 50 then injects low pressure compressed air into the cylinder during a selected portion of the power stroke after the piston has been moved downwardly by the high pressure air. In one embodiment, the initial high pressure blast of air forces the piston 12 downwardly to a position corresponding approximately to 20° ATDC at which time intake valve 14 opens thereby admitting low pressure air (for example and without limitation 150 psi) from tank 25 into the cylinder 11 until the piston 12 reaches a position corresponding approximately to 110° ATDC. The intake valve 14 is then closed. As a result of similar power stroke operations in the other cylinders of the engine 10, the piston is carried downwardly to its lowermost position and then is returned upwardly in a return or exhaust stroke.

The exhaust means 16 then opens for a selective portion of exhaust stroke of the piston 12 to expel exhaust gas into line 67. In one embodiment, the exhaust valve 15 (FIG. 5) for a given cylinder 11 is opened at approximately 185° ATDC, allowing the air in cylinder 11 to enter into exhaust manifold 66 where the air is cycled back to air compressor 24 thereby assisting compressor 24 in re-supplying high pressure air. As motor 10 is driven by the high pressure and low pressure air, the drive shaft 13 is rotated thereby making energy available to the user of the system while at the same time powering hydraulic pump 29 which in turn powers air compressors 24, 28. Compressors 24, 28 thereby return a portion of the energy converted by the power plant 10 back to its original source, tanks 21, 25.

Another embodiment of the present invention may utilize additional electric power sources in place of or in addition to the hydraulic system which includes pump 29 and compressor 24, 28. For example, air compressors 24 and 28 may be adapted to be operated by electric motors, as opposed to hydraulic motors, which are powered directly from battery 202. Additionally, battery 202 may be connected to a standard generator or alternator mounted to motor 10 which may be used to recharge battery 202 during operations of the subject power plant. Utilizing such an electrical system for compressing the high and low pressure air would eliminate the need of hydraulic pump 29, tank 31, compressor 200 and associated conduits. However, it is believed that battery 202 would need to be sized appropriately in order to provide sufficient power for initial charging of tanks 21, 25 as well as supply additional power as need. Alternatively, it is contemplated that battery 202 may be used in combination with auxiliary compressor 200 which is electrically operated by battery 202 for the purpose of initially charging tanks 21, 25. After this initial charge, the hydraulic system consisting of pump 29 and tank 31 could then be used to operate compressors 24, 28 until the total amount of energy initially contained within the entire power plant system has been dissipated.

The present invention therefore provides a means for constructing a highly efficient air operated engine or motor or for the converting of a standard internal combustion engine to a compressed air power plant. One feature of the present invention is the recycling of partially expanded air back through the system and using a portion of the power generated by the engine to operate the air compressor which partially recharges or supplements the air tanks.

The present invention provides several advantages over standard internal combustion engines. For example, it has been found that the subject engine may operate on as little 20 psi and idle as low as 200 revolutions per minute. Cooling water is typically not necessary since there is no heat of combustion generated within the engine. A standard oil system with a high volume oil pump is typically sufficient to provide the oil needed for operation. Additionally, the lubricating oil of the present invention will not be subjected to the usual heat and gas impurities which shorten the effective life of such oil which is typically found in standard internal combustion engines. Because the engine does not give off the impurities of combustion, the engine is essentially pollution free.

Figure 4:
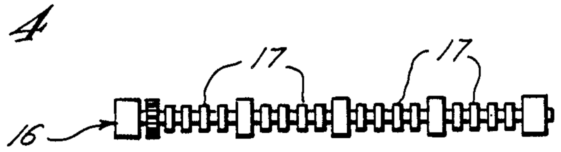
FIG. 4 is a side view illustrating an example of a cam shaft suitable for use in converting a V-8 engine in accordance with the preferred embodiment of the present invention.

The present invention also provides a conversion kit for converting an internal combustion engine to a compressed air power plant, wherein the internal combustion engine has a plurality of cylinders with pistons disposed therein, the cylinders each having an intake valve and exhaust valve operatively associated therewith. The kit may comprise a cam shaft 11 specifically adapted to be mounted in the particular standard internal combustion engine in the place of the standard cam shaft and operatively associated with the piston 12, intake valve 14 and exhaust valve 15. The cam shaft 16 which has been specifically adapted for the particular internal combustion engine includes a plurality of cams 17 as best shown in FIG. 4, shaped and sized to selectively open and close the intake valves 14 and exhaust valve 15 in a timed relationship with the movement of the piston 12 such that each piston 12 has a power stroke and exhaust stroke and such that the intake valve 14 for a given cylinder 11 is open during a selected portion of the power stroke of the piston 12 for the cylinder 11 and such that the exhaust valve 15 is open during a selected portion of the exhaust stroke of the piston for the cylinder 11.

In one preferred embodiment, wherein the cam shaft is adapted for insertion into a standard engine such as for example and without limitation a standard 350 cubic inch Chevrolet 195 engine, the cam shaft 16 is configured in a manner such that it coordinates the operation of cylinders 1 and 6 such that their respective pistons are similarly positioned with respect to each other during their cycle of operation and are each operated as a pair, cylinders 8 and 5 as a pair, cylinders 4 and 7 as a pair, and cylinders 3 and 2 as a pair. (See FIG. 2 for the numbering of the cylinder). The customized cam shaft 16 is shaped to cause the intake and exhaust valves of the respective cylinders to open and close as shown in the following table:

| CYLINDER | INTAKE OPEN | INTAKE CLOSE | EXHAUST OPEN | EXHAUST CLOSE |
|---|---|---|---|---|
| 1 6 | 20° ATDC | 110° ATDC | 185° ATDC | 330° ATDC |
| 8 5 | 110° ATDC | 200° ATDC | 275° ATDC | 60° ATDC |
| 4 7 | 200° ATDC | 290° ATDC | 5° ATDC | 150° ATDC |
| 3 2 | 290° ATDC | 20° ATDC | 95° ATDC | 240° ATDC |

It should be appreciated that the above figures represent a preferred embodiment, but may vary depending upon the specific engine which is to be converted or built and the specific needs of the ultimate user.

The conversion kit further includes an air distributing means 35 for distributing compressed air to each of the cylinder 11 at the initial portion of the power stroke of the piston 12 disposed in each of cylinder 11. The distributing means 35 may be secured to the engine 10 such that it is operated by the engine 10 in a selectively timed relationship to effect the ejection of the compressed air at the initial portion of the power stroke of the respective piston 12.

The conversion kit further includes compressed air means 20 for supplying air at a high pressure to the distributing means 35 and at a second pressure lower than the high pressure to the intake valve 14 of each of the cylinder 11.

The kit may further include a means 65 for communicating air exhausted from the exhaust valves back to the compressed air means 20.

The instant invention has been disclosed in connection with a specific embodiment. However, it will be apparent to those skilled in the art that variations from the illustrated embodiment may be undertaken without departing from the spirit and scope of the invention. For example, a single air tank having two outlets with air pressure regualtors may be utilized in place of the two air tanks. Also, electric motors may be utilized in the place of the hydraulic motor 29 or the hydraulically operated compressors 24, 28 may be replaced by an electically operated single compressor. These and other variations will be apparent to those skilled in the art and are within the spirit and scope of the present invention.

As used in the specification and in the appended claims, it should be understood that the word connect or a derivative thereof, implies not only a direct, immediate connection between two recited parts, but also embraces the various arrangements wherein the parts are operatively connected, although other elements may be physically located within the connected parts. Further, the word "a" does not preclude the presence of a plurality of elements accomplishing the same function. For example, a cylinder and a piston should be understood to include either a single cylinder with a piston disposed therein, or a plurality of cylinders with pistons disposed therein carrying out the same function.

What is claimed is:

1. A compressed air power plant, comprising:
   - a piston disposed within a cylinder and connected to a drive shaft such that the piston has a power stroke and an exhaust stroke;
   - compressed air means for supplying compressed air at a high pressure and at a second pressure lower than the high pressure;
   - distributing means operatively associated with the piston and the compressed air means for selectively communicating the compressed air at a high pressure to the cylinder at the initial portion of the power stroke; and
   - intake means operatively associated with the piston and the compressed air means for selectively admitting compressed air at the second lower pressure to the cylinder for a selected portion of the power stroke after the communication of high pressure air to the cylinder.

2. The power plant of claim 1, further comprising exhaust means for exhausting air from the cylinder during the exhaust stroke.

3. The power plant of claim 2 wherein the exhaust means communicates with the compressed air means such that air exhausted from the cylinder during the exhaust stroke is directed to the compressed air means.

4. The power plant of claim 1, comprising a plurality of said cylinders and pistons connected to the drive shaft.

5. The apparatus of claim 3, wherein said distributing means comprises:
   (a) a housing having an aperture;
   (b) a rotor rotatably mounted within the housing, the rotor having a bore having an inlet and an outlet, the outlet being disposed such that upon rotation of the rotor, the outlet cyclically aligns with the housing aperture, the inlet communicating with the compressed air means for receiving compressed air at the high pressure; and
   (c) a distributing line connected between the housing aperture and the cylinder;

wherein the rotor is operatively associated with the piston such that the rotor distributes compressed air at the high pressure from the compressed air means to the cylinder at the initial portion of the power stroke for the piston.

6. The power plant of claim 3 further comprising cam means operatively associated with said intake means, said exhaust means and said piston for cyclically opening and closing said intake means and said exhaust means in a selectively timed relationship to the power and exhaust strokes of the piston such that the intake means opens during a selected portion of the power stroke of the piston and such that the exhaust means opens during a selected portion of the exhaust stroke of the piston.

7. A compressed air power plant, comprising:
   (a) a piston and cylinder type engine having a plurality of cylinders including pistons disposed therein, the pistons being operatively connected to as driveshaft such that each piston has a power stroke and an exhaust stroke;
   (b) compressed air means for supplying compressed air to the cylinders at a high pressure and at a second pressure lower than the first pressure;
   (c) distributing means for communicating compressed air at the high pressure selectively, in a timed relationship to the cylinders of the engine at the initial portion of the power stroke of the piston of each of the respective cylinders; and (d) intake means operatively associated with each of the cylinders for selectively admitting compressed air at the second pressure into the cylinders during the power stroke of the piston of the respective cylinders at a predetermined time after the communication of compressed air at the high pressure into the cylinder.

8. The power plant of claim 7, further comprising exhaust means for selectively exhausting air from the respective cylinders during the exhaust stroke.

9. The power plant of claim 8 wherein the compressed air means includes:

(a) a high pressure compressed air tank connected in communication with the distributing means;

(b) a low pressure compressed air tank connected in communication with the intake means;

(c) a high pressure air compressor communicating with the high pressure compressed air tank;

(d) a lower pressure air compressor communicating with the low pressure compressed air tank.

10. The power plant of claim 9 wherein the exhaust means is connected in communication with the high pressure air compressor such that the air exhausted from the cylinders is fed into the high pressure air compressor to assist the compressor.

11. The power plant of claim 10 further comprising cam means operatively associated with said intake means, said exhaust means and said pistons for cyclically opening and closing said intake means and said exhaust means in a selectively timed relationship to the power and exhaust strokes of the pistons such that the intake means of a given cylinder opens during a selected portion of the power stroke of the piston for that cylinder and such that the exhaust means of a given cylinder opens during a selected portion of the exhaust stroke of the piston for that cylinder.

12. The power plant of claim 10 wherein said distributing means comprises:

(a) a housing having a plurality of apertures;

(b) a rotor rotatably mounted within the housing, the rotor having a bore having an inlet and an outlet, the outlet being disposed such that upon rotation of the rotor, the outlet sequentially aligns with the housing apertures, the inlet communicating with the high pressure compressed air tank; and (c) a plurality of distributing lines selectively connected between the housing apertures and the cylinders;

wherein the rotor is operatively associated with the pistons such that the rotor distributes air from the high pressure compressed air tank through a distributing line to a given cylinder at the initial portion of the power stroke for the piston of that cylinder.

13. A conversion kit for converting an internal combustion engine to a compressed air power plant, the engine having a plurality of cylinders with pistons disposed therein, the cylinders each having an intake valve and an exhaust valve operatively associated therewith, comprising:

(a) a cam shaft adapted to be mounted in the engine and operatively associated with the pistons, intake valves and exhaust valves, the cam shaft including a plurality of cams shaped and sized to selectively open the intake valves and the exhaust valves in a timed relationship with the movement of the pistons such that each piston has a power stroke and an exhaust stroke and such that the intake valve for a cylinder is opened during a selected portion of power stroke of the piston for that cylinder and such that the exhaust valve is opened during a selected portion of the exhaust stroke of the piston for that cylinder;

(b) air distributing means for distributing compressed air to each of the cylinders at the initial portion of the power stroke of the piston disposed in each cylinder, the distributing means being securable to the engine such that it is driven by the engine in a selectively timed relationship with the movement of the pistons of the respective cylinders; and (c) compressed air means for supplying air at a high pressure to the distributing means and at a second pressure lower than the high pressure to the intake valves of each of the cylinders.

14. The kit of claim 13, further comprising means for communicating air exhausted through the exhaust valves to the compressed air means.

* * * * *